TUTTLE & GANS.
Wheel Cultivator.
No. 69,725.             Patented Oct. 8, 1867.
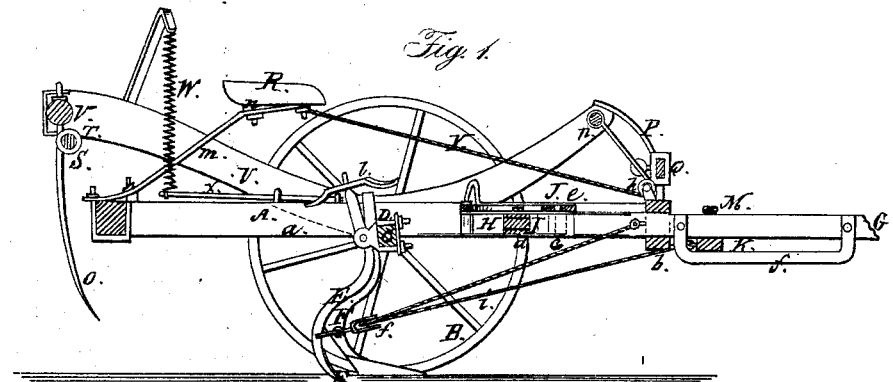
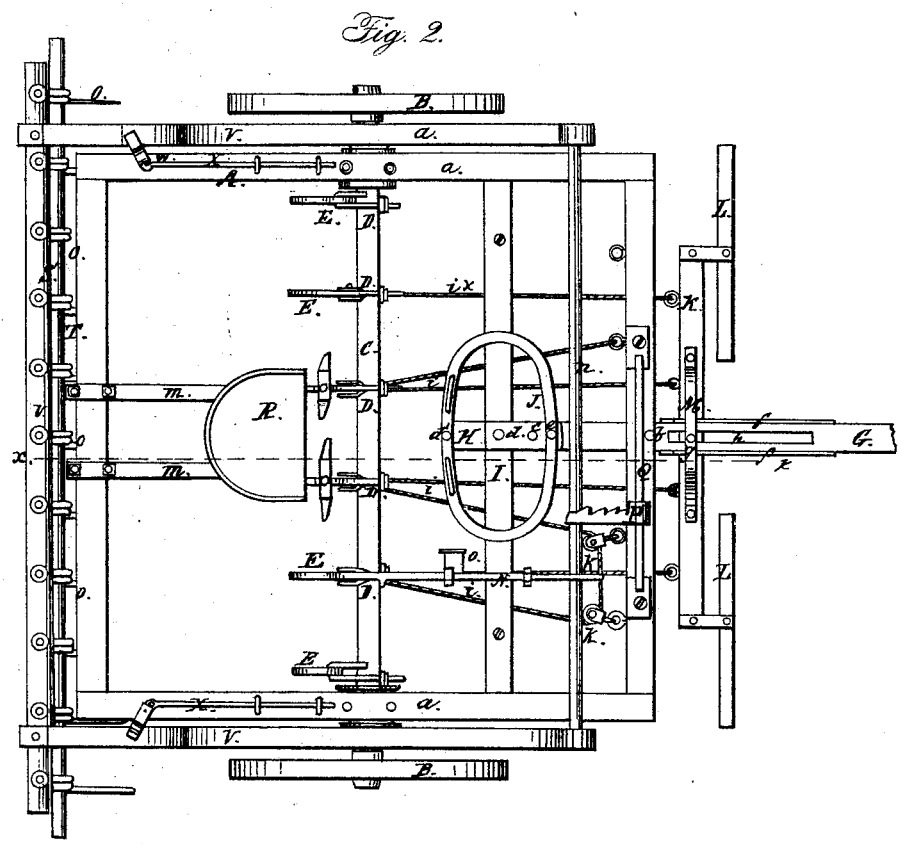
Witnesses:          Inventor:

United States Patent Office.

STERLING D. TUTTLE AND JOHN H. GANS, OF EATON, OHIO.

*Letters Patent No. 69,725, dated October 8, 1867.*

IMPROVED CULTIVATOR.

*The Schedule referred to in these Letters Patent and making part of the same.*

TO ALL WHOM IT MAY CONCERN:

Be it known that we, S. D. TUTTLE, and JOHN H. GANS, of Eaton, in the county of Preble, and State of Ohio, have invented a new and improved Cultivator; and that the following description, taken in connection with the accompanying drawings, hereinafter referred to, forms a full and exact specification of the same, wherein we have set forth the nature and principles of our said improvements, by which our invention may be distinguished from all others of a similar class, together with such parts as we claim and desire to have secured to us by Letters Patent.

This invention relates to a new and improved device for cultivating corn, cotton, and other crops which are grown in hills or drills. The invention consists in a novel construction and arrangement of parts, as hereinafter fully shown and described, whereby a very desirable implement for the purpose specified is obtained. In the accompanying sheet of drawings—

Figure 1 is a side sectional view of our invention taken in the line $x\ x$, fig. 2.

Figure 2, a plan or top view of the same.

Similar letters of reference indicate like parts.

A represents the frame of the machine, constructed of rectangular form, and mounted on two wheels B B, which are placed loosely on their axle C, the latter, however, being allowed to turn in its bearings which are at the under sides of the side pieces $a\ a$ of the frame A. On the axle C there is secured, at equal distances apart, a series of clips, D, in each of which, at the rear of the axle, there is pivoted a plough-beam, E, having ploughs F attached to their lower ends, as shown clearly in fig. 1. G is a draught-pole, which is secured by a pivot-bolt, $b$, in the front cross-piece of the frame A, the draught-pole extending through a mortise in said cross-piece, and having its rear end pivoted, as shown at $c$, in a metal socket, H, which is secured by a pivot-bolt, $d$, on a cross-bar, I, of the frame A, a short distance at the rear of and parallel with the front cross-piece of the frame A. J is an elliptical or oval-shaped foot-piece, to the back part of which the rear end of the socket H is pivoted, as shown at $d'$, and the front part of said foot-piece is pivoted to the front part of the socket H, as shown at $e$, the pivot also passing through the draught-pole. K represents a double-tree, having a whiffle-tree, L, attached to each end of it as usual. This double-tree rests or works on metallic bars $f\ f$, underneath the draught-pole, and a bolt, $g$, passes through the centre of the double-tree through an oblong slot, $h$, in the draught-pole, and through a metallic bar, M, attached to the upper surface of the double-tree. The oblong slot $h$ admits of a forward and backward movement of the double-tree underneath the draught-pole, and the double-tree is connected by ropes or chains $i$ to the plough-beams E, and connected directly to them, as shown at $i^\times$ in fig. 2, or connected by a pulley or sheave, as shown at $j$, (see fig. 1,) the cord or chain passing from the double-tree through the sheave $j$, which is connected to the plough-beam and then, extending forward, is attached to the front cross-piece of frame A, or, one rope or chain $i$ may be connected to two plough-beams by passing through sheaves attached to the plough-beams, and through sheaves $k\ k$ attached to the front cross-piece of the frame A. This latter method, which is shown clearly in fig. 2, is preferable, as in case of one plough F coming in contact with any obstruction, and its forward movement resisted, the other plough, which is connected with it by the same rope or chain, will be forced forward and deeper into the earth, so as to have sufficient power under the pull or draught to raise and draw forward the obstructed one. It will be seen from the above description that the power or draught of the team is direct upon the plough-beams E, and the ploughs F have a tendency, under the draught or pull of the team, to penetrate the earth. One of the plough-beams E, has an arm or lever, N, attached to it, provided with a foot-piece, O. This arm or lever may be pressed down and retained at any point by a toothed segment bar, P, fitted on a horizontal bar, Q, attached to the front cross-piece of the frame A. This segment bar P may be adjusted or moved on the bar Q at different points to suit the position of the lever N, the beam of which will vary in position according to the adjustment of the ploughs, the beams of which are all adjustable on the axle C. By means of this lever N the ploughs may all be raised simultaneously out of the ground when required, and any individual one may be raised by the driver pressing his foot against a bar, $l$, on the upper ends of the plough-beams. The ploughs may also be adjusted laterally, as the beams have sufficient play in the clips to admit of that. The draught-pole may also be turned more or less obliquely to the right or left, to guide or turn the machine sufficiently to the right or left, by the driver actuating the foot-piece J. The driver's seat R is attached to the front ends of inclined bars m m, which are secured to the rear cross-piece of the frame A. By this means the weight of the driver is thrown upon the rear part of the machine, and the necks of the team relieved from any undue downward pressure. The seat R has wedges n inserted under its rear part, by adjusting which the seat may be raised more or less at its rear to suit the convenience of the driver. S represents a rake provided with wire teeth o, which are coiled at their upper ends around a rod, T, and pass through a head, U, the ends of which have their bearings in the rear parts of curved bars V V, which are fitted on the axle C, so that they may work or turn thereon. Each bar V is connected to two springs W X, the springs W being spiral ones, and X ordinary flat or cylindrical springs which are attached to the side pieces of the frame A. These springs have a tendency to keep the rake-teeth down to their work. The rake-teeth may be raised at any time from the ground by means of a rope, Y, which extends from the driver's seat R, passes underneath a pulley, p, on the front cross-piece of the frame, and passes up to a rod, r, which connects the front ends of the bars V V.

Having thus described our invention, we claim as new, and desire to secure by Letters Patent—

1. The sliding or adjustable double-tree K, applied to the draught-pole G, substantially as shown and described, and connected to the plough-beams E on the axle C, all being arranged to operate substantially in the manner as and for the purpose set forth.

2. The pivoting of the draught-pole G to the main frame A, in connection with the pivoted socket H, and the foot-piece J, all arranged to operate substantially as and for the purpose specified.

3. The arm or lever N, provided with the foot-piece O, and the toothed segment bar P on the front cross-piece of the frame A, the arm or lever N being attached to a plough-beam, E, and all arranged substantially as and for the purpose set forth.

4. The rake S, connected to the arms V, fitted on the axle C, and having the springs W X attached to them substantially, as shown and described.

5. The application and arrangement of the rope Y, as shown and described, for the purpose of raising the rake when required.

6. The combination of the sliding double-tree K, plough-beams E on the axle C, and the pivoted or laterally adjustable draught-pole G, all arranged to operate in the manner substantially as and for the purpose set forth.

STERLING D. TUTTLE,
JOHN H. GANS.

Witnesses:
  B. F. LARSH,
  R. W. QUINN.